Patented Feb. 26, 1952

2,587,466

UNITED STATES PATENT OFFICE 2,587,466

PROCESS OF CANNING PEPPERS

Richard W. Harris, Bridgeville, Del., assignor to H. P. Cannon & Son, Incorporated, Bridgeville, Del., a corporation of Delaware No Drawing. Application May 11, 1950, Serial No. 161,470

8 Claims. (Cl. 99—186)

1

The present invention relates to a novel process for canning peppers, and more particularly to a commercial process for canning diced peppers by which the main difficulty encountered heretofore in the canning of peppers, as well as other difficulties, is overcome.

The general procedure for canning diced peppers as it has existed heretofore for many years, involved first blanching peppers, previously washed, peeled and cored, for a few minutes either with steam or with hot water. The blanched peppers were then diced and the resulting mixture of dice and juice was filled into cans. An edible organic acid was added to provide a predetermined pH in the liquid medium. The contents of the can were then cooked for an extended period, the exact cooking procedure varying somewhat. For example, the cooking took place after the cans were sealed, and the cooking was accomplished either by placing the cans in hot water or by subjecting them to steam. The extent of cooking thus depended upon the type of cooking employed, varying from at least 30 minutes when steam was employed up to over an hour when hot water was employed.

There has long been recognized in the art, a serious problem in the canning of peppers. Because of the nature of the pepper flesh, much of it deteriorated during the operations subsequent to the can-filling step with the result that there was a marked decrease in the content of solids in the can by the time it reached the consumer. In other words, when the contents of a finished can were emptied into a sieve, it was found that the weight of solids retained on the sieve (the "drained weight") was substantially less than the drained weight of the solids filled into the can, the lost weight, of course, being now in the juices which were, for the most part, discarded. For example, with a standard No. 10 can, to which about 4½ pounds of pepper dice were added during the filling step, the product as received by the consumer contained only about 3½ pounds of drained solids.

There were other significant problems. Closely related to the loss in drained weight, were the deleterious physical effects on the pepper dice. The pepper dice tended to be rather mushy. In addition, the blanching of the cored and peeled peppers softened the peppers to the extent that dicing was difficult, the resulting dice being irregular and ragged. The raggedness and irregularity of the dice, coupled with their mushy consistency, left room for much improvement with respect to the product's appearance.

2

A further disadvantage of the above-described general process was the fact that the cans had to be filled with the mixture of pepper dice and juice by a manual operation. Difficulty was encountered in using mechanical fillers because of the lack of accurate control in the ratio of dice to juice added to each can. Also, the amount of juice added with the dice to each can governed the amount of acid solution that could be subsequently added. Thus, when it was attempted to fill the cans with the mixture of pepper dice and juice by automatic mechanical means, inconsistent dice to juice ratios or acidities, or both, resulted.

It is a principal object of the present invention, therefore, to provide a process for canning diced peppers wherein one or more of the above-mentioned difficulties is overcome.

A further object is to provide a process for canning diced peppers wherein the drained weight of pepper solids provided in the finished can is substantially the same as the weight of drained pepper solids filled into the can.

Another object is to provide a process for canning diced peppers which provides a product in which the pepper dice are firm and crisp.

Still another object is to provide a process for canning diced peppers which provides a product in which the pepper solids are in the form of firm, crisp clean-cut dice, and possess an appearance markedly improved over prior canned diced pepper products.

Still another object is to provide a process for canning diced peppers in which the pepper dice may be filled into the cans by automatic mechanical means.

Other objects will be apparent from a consideration of the following specification and the claims.

The process of the present invention comprises subjecting raw pepper dice to direct contact with steam for a brief interval to quickly heat the dice throughout to above about 180° F. and draining the resulting juice from the dice; filling the resulting hot, drained dice into the can and adding to the can an aqueous solution of an edible organic acid having a temperature between about 180° F. and about 212° F. and providing a pH below about 4.5 in the contents of the can, in an amount to provide the proper liquid level; sealing the can; and after at least about one minute from the time the can is sealed, quickly cooling the can; the temperature of said pepper dice, from the time they are subjected to the steam until they are quickly cooled in the sealed can, not falling appreciably below about 175° F. The term "pepper" as used herein, refers to the red and the green varieties and includes pimentos. The present process is particularly applicable for the canning of diced red peppers.

As the result of the above sequence of steps, the canned diced peppers are commercially sterile and ready for use by the consumer. The dice are clean-cut and physically are crisp and firm. Of primary importance, however, is the fact that there has been no significant degradation of the pepper flesh so that the drained weight of the contents of the can is substantially the same as the drained weight of the dice filled thereinto. It will also be noted that the juice resulting from the subjecting of the dice to the brief treatment with steam is drained from the hot pepper dice. This permits the hot dice to be directly filled into cans by means of an automatic mechanical filler, the liquid medium being added to the can separately. As will be discussed more in detail hereinafter, a portion or all of the drained juice may be later incorporated with the pepper dice in the can.

Referring more particularly to the process, the preparation of the pepper dice which are treated in accordance with the present process is more or less conventional with the exception that the peppers need not be blanched, that is, treated with either hot water or steam prior to the dicing. The pepper dice, treated in accordance with the present process, may thus be, and preferably are, raw and, of course, in any event will be uncooked. The raw peppers are generally first washed and opened for removal of the seeds and cores. The resulting raw pepper pieces are then diced, that is, cut into small cubes which may range from about ¼" to about ½" in size. Since, in accordance with the present process, no blanching of the peppers prior to dicing is required, the peppers at the time of dicing may be in their crisp raw state so that dicing is facilitated and cleaner cuts are obtained.

In accordance with the first main step of the process, as stated, the pepper dice are subjected to direct contact with steam for only sufficient time to heat the dice throughout to a temperature above about 180° F. While the dice during this step may momentarily reach a temperature as high as about 250° F. if the treatment is carried out under pressure, they generally will not be heated to a temperature above 212° F. Preferably during this step the dice are heated to between about 190° F. and about 205° F. The treatment of the dice with the steam may be carried out in any desired apparatus wherein the steam may directly contact the dice. For instance, the dice may be spread out in a layer and jets of steam directed thereon, or the dice may be placed in a vessel equipped with perforated tubes so that the steam may permeate through the mass of dice. Preferably, the dice are agitated during the steam treatment to insure contact of all surfaces of the dice with the steam. Such agitation may be accomplished by virtue of the force of steam jets or by tumbling the dice in the presence of the steam. It will be seen readily that this step permits continuous form of operation whereby the dice may be continuously fed to a steaming zone. A particularly advantageous method of carrying out the steam treatment is by use of a scroll or screw conveyor in a cylindrical shell into one end of which the dice are fed and into which the steam is injected contacting the dice as they tumble along the conveyor. This method particularly insures thorough heating of the individual dice. In such a device the steam may be fed through the shaft of the screw or scroll and out into contact with the dice through perforations in the shaft.

The above-described steam treatment is primarily for the purpose of quickly raising the temperature of the dice to the hereinabove-stated range, no significant cooking being effected, thus storing heat in the dice and expelling air therefrom. For these purposes the steam treatment may be brief. While the exact duration of the steam treatment will vary depending upon many factors, including the temperature of the steam, the amount of steam in relation to the amount of pepper dice, the efficiency of contact between the steam and pepper dice, and the heat loss from the apparatus, no difficulty will be encountered by those skilled in the art in arriving at the exact procedure of steam treatment when it is borne in mind that the essential requirement is that the treatment with steam be such as to heat the pepper dice to the temperature hereinabove set forth.

As also stated, the juice formed during the steam treatment, by virtue of the condensed steam, is drained from the hot pepper dice before they are filled into the cans. The juice may be drained from the dice during the entire steam treatment, or during the later portion of the steam treatment, or after the steam treatment, or both after and during at least the later portion of the steam treatment. The drainage of the dice may be carried out by a wide variety of means as will readily occur to those skilled in the art. For example, referring to the screw conveyor mentioned above, the portion nearest the exit end thereof may be provided with a perforated wall so as to permit the juice to drain away from the hot tumbling dice, before they are ejected from the conveyor.

The hot drained dice are then, before any appreciable loss of heat, that is, at least before the temperature thereof falls below about 175° F., filled into cans. Since the present process permits the use of a mechanical filler, such a filler is preferably employed in the filling of the cans. The filler may be an integral part of the apparatus in which the dice were subjected to steam and drained, and into which they may be directly discharged from the steaming and draining unit. On the other hand, the filler may be separate and apart, requiring conveyance of the hot drained dice thereto by suitable means as by a scroll type or other conveyor. The actual filling of the hot drained dice into the cans presents no problem to those skilled in the art.

As stated, there is also added to the can a hot aqueous solution of an edible organic acid. This solution will be at a temperature between about 180° F. and about 212° F., preferably between about 190° F. and about 205° F. The hot solution may be added to the can at any time either immediately before, during, or immediately after the addition of the hot pepper dice to the can. Or part of the solution may be added before, and part of the solution added after the addition of the hot pepper dice to the can. From the standpoint of ease of operation, the hot solution is advantageously added immediately after the addition of the dice. Thus, for example, the cans, after the dice have been added thereto, may be passed to a conventional syruper where the hot solution is added. The amount of solution added will be such as to provide a body of liquid surrounding and covering the dice and filling the can substantially to its top.

The solution will contain dissolved therein a water-soluble, edible organic acid, exemplified by citric acid, lactic acid, acetic acid, and the like. Of the acids available, citric acid is preferred. The pH of the solution will be such as to provide a pH of less than about 4.5 in the contents of the can; and the pH provided may be as low as about 3, or even lower although extremely low pH's may impart an objectionable taste to the canned product. Preferably the pH of the contents of the can will be between about 4 and about 4.3. Since the pepper dice themselves have a pH above 4.5, it will be understood that the pH of the acid solution as prepared will be somewhat lower than that provided by the resulting mixture of dice and solution. This solution may also contain other materials conventionally added to the product in the canning art such as flavoring agents, and the like. The juice drained from the pepper dice during the preceding part of the process may also provide some or all of the water of the solution. Thus, it will be understood that the term "aqueous solution of edible organic acid" refers to such mixtures, as well as to simple solutions of the acid in water. Although it is preferred to dissolve the acid in the aqueous medium prior to the admission of the solution to the can, the solid acid and the hot aqueous medium may be separately admitted to the can, if desired, and it will be understood that either mode of incorporating the hot acid solution in the can is included in the term "adding the hot acid solution to the can."

After the hot pepper dice and hot acid solution have been added to the can, the can is sealed without permitting the temperature of the hot contents of the can to drop appreciably below about 175° F. After the can is sealed, the temperature of the hot contents of the can is not permitted to drop appreciably below about 175° F. for a relatively brief period which will be at least 1 minute, and which generally ranges from about 2 minutes to about 12 minutes. Holding times beyond about 15 minutes result in a progressively softer and mushier product. After this holding period, the can and its contents are quickly cooled. The maintenance of the can and its contents at the elevated temperature for the specified period before rapid cooling completes sterilization of the contents and the container. The heat contained in the hot pepper dice and in the hot acid solution may be relied upon to maintain the elevated temperature so long as the can is not subject to harsh cooling conditions during the desired period in cases where larger cans, such as Number 10 cans are used. For instance, larger cans may merely be allowed to stand for the desired period in a room maintained at ordinary temperatures. With smaller cans, such as Number 1 or 2 cans, heat may be required to prevent the lowering of the temperature of the contents thereof for the desired period. During this period, of course, the cans may be transported, or stacked or otherwise prepared for the subsequent cooling step.

After the stated period during which the contents of the can are permitted to remain in their heated condition, the sealed can and its contents are rapidly cooled to at least about 120° F., preferably to at least 110° F. This may be accomplished in any desired manner, although submerging the cans in cold water is especially advantageous. Preferably, the can is rolled or otherwise subjected to motion while in the cold water to agitate the contents so as to facilitate cooling. After the cans have been cooled, they are ready for use by the consumer, and may be prepared for commerce, as by labelling, packing, and the like, in manners well known to those in the art.

It will be noted from the above, that throughout the process, from the time the pepper dice are initially heated with steam to the stated temperature, until they are quickly cooled in the sealed can, the temperature of the pepper dice is not permitted to drop below about 175° F. Except for the case where elevated pressure may be employed during the steam heat treatment of the dice to facilitate rapid heating thereof, in which case the temperature of the dice may momentarily reach a point above 212° F., the temperature of the dice will not be above 212° F. from the time they are filled into the can until the can and its contents are rapidly cooled. The rapid heating of the dice to the stated temperature followed, in relatively rapid succession, by draining the juice, filling the hot drained dice into the can and incorporating the hot aqueous acid solution in the can, sealing the can, maintaining the contents of the can at elevated temperature for the stated brief period and rapidly cooling the can and its contents, provide a simple yet markedly improved process for canning diced peppers whereby the disadvantages of prior canning procedures have been overcome.

The operation of the process of the present invention may be more easily understood from a consideration of the following specific example which is given solely for the purpose of illustration and is not intended to limit the scope of the invention in any way.

*Example*

Red sweet peppers are opened, the seeds and cores removed. The raw pepper pieces are then fed to a dicer where they are cut into cubes having dimensions of about ¼". The resulting dice are then continuously fed at the rate of about 200 pounds per minute, to a scroll or screw type conveyor 10 inches in diameter and 12 feet in length. Through the shaft and into the conveyor is injected steam at a pressure of about 100 pounds per square inch at the rate of about 45 pounds per minute. It takes about 2 minutes for the dice to pass through the conveyor during which time they become heated to 200° F. The tumbling of the dice as they pass through the conveyor insures thorough contact thereof with the steam injected into the conveyor. The latter part of the conveyor has perforated walls so that the juice formed may be drained from the dice. The hot drained dice, in a loose condition, are then conveyed to a mechanical filler from which metered amounts are filled into cans, such as number ten cans. After each can is filled with the hot dice, it passes to a conventional syruper where an aqueous solution containing about 0.08 pounds of citric acid per gallon of water and at a temperature of 200° F. is added to the can to cover the pepper dice and providing a level of liquid near the top of the can. The pH of the resulting mixture is about 4.1. The filled can is then conveyed to sealing apparatus where it is hermetically sealed. The contents of the can are still at 195–200° F., and the can is permitted to stand for nine minutes during which time no significant drop in temperature of the contents of the can occurs. The can is then immersed in cold water having a temperature of about 55° F., and is rolled therein for 15 minutes until the contents of the can have cooled to about 100° F. The can is then removed from the water and, after labelling, is ready for use.

Considerable modification is possible in the exact technique of practicing the process without departing from the scope of the invention.

I claim:

1. The process for canning peppers which comprises subjecting diced peppers to direct contact with steam until said pepper dice are heated to a temperature above about 180° F. and draining the resulting juice from the hot pepper dice; filling the hot, drained pepper dice into a can and adding to the can in an amount to cover the hot pepper dice an aqueous solution of an edible organic acid at a temperature between about 180° F. and about 212° F., said solution providing a pH below about 4.5 in the contents of the can; sealing the can, and, after a period of at least one minute from the time at which the can is seaeld, quickly cooling the sealed can and its contents to at least about 120° F., the temperature of said pepper dice from the time they are contacted with the steam until they are quickly cooled in the sealed can not falling appreciably below about 175° F.

2. The process of claim 1 wherein said pepper dice are subjected to direct contact with steam until they are heated to a temperature not over 212° F.

3. The process of claim 1 wherein said pepper dice are subjected to direct contact with steam until they are heated to a temperature between about 190° F. and about 205° F.

4. The process of claim 1 wherein said hot aqueous acid solution provides in the contents of the can a pH between about 4 and about 4.3.

5. The process of claim 1 wherein said hot aqueous acid solution has a temperature between about 190° F. and about 205° F.

6. The process of claim 1 wherein said sealed can and its contents are quickly cooled not later than about 15 minutes from the time at which the can is sealed.

7. The process for canning peppers which comprises subjecting raw diced peppers to direct contact with steam until said pepper dice are heated to a temperature between about 190° F. and about 205° F. and draining the resulting juice from the hot pepper dice; filling the hot, drained pepper dice into a can and adding to the can in an amount to cover the hot pepper dice an aqueous solution of an edible organic acid at a temperature between about 190° F. and about 205° F., said solution providing a pH between about 4 and about 4.3 in the contents of the can; sealing the can, and, after a period of of from about 2 to 12 minutes from the time at which the can is sealed, quickly cooling the sealed can and its contents to at least 110° F., the temperature of said pepper dice from the time they are contacted with the steam until they are quickly cooled in the sealed can not falling appreciably below about 175° F.

8. The process of claim 7 wherein said edible organic acid is citric acid.

RICHARD W. HARRIS.

REFERENCES CITED

The following references are of record in the file of this patent:

UNITED STATES PATENTS

| Number | Name | Date |
|---|---|---|
| 2,073,006 | Gray et al. | Mar. 9, 1937 |
| 2,073,340 | Eberts | Mar. 9, 1937 |

OTHER REFERENCES

"Appertizing" by Bitting, 1937, pages 593 to 597.